Feb. 2, 1971 L. M. WEIXELMAN 3,560,838
DIRECT CURRENT OR ALTERNATE CURRENT CONVERTER HAVING VARIABLE PULSE WIDTH AND FREQUENCY
Filed Sept. 26, 1968 2 Sheets-Sheet 1

INVENTOR.
LAWRENCE W. WEIXELMAN
BY
Hopgood & Calimafde
ATTORNEYS

INVENTOR.
LAWRENCE W. WEIXELMAN
BY
Hopgood & Calimafde
ATTORNEYS

United States Patent Office 3,560,838

Patented Feb. 2, 1971

3,560,838

DIRECT CURRENT OR ALTERNATE CURRENT CONVERTER HAVING VARIABLE PULSE WIDTH AND FREQUENCY

Lawrence M. Weixelman, Wichita, Kans., assignor to Electronic Communications, Inc., St. Petersburg, Fla., a corporation of New Jersey Filed Sept. 26, 1968, Ser. No. 762,733

Int. Cl. H02p *13/18*; H02m *1/08*

U.S. Cl. 321—16 14 Claims

ABSTRACT OF THE DISCLOSURE

A DC to AC inverter includes a first pair of complementary transistors having their respective collector-emitter circuits coupled in series with an inductive load. The second pair of complementary transistors similarly have their collector-emitter circuits coupled in series with the load. Of the respective pair, both first type transistors have their collector-emitter circuits coupled to a DC source terminal and both second type transistors have their collector-emitter circuits coupled to the other DC source terminal. The bases of the first type transistors are now simultaneously driven by an independent oscillator circuit to effect the conversion.

Figure 2:
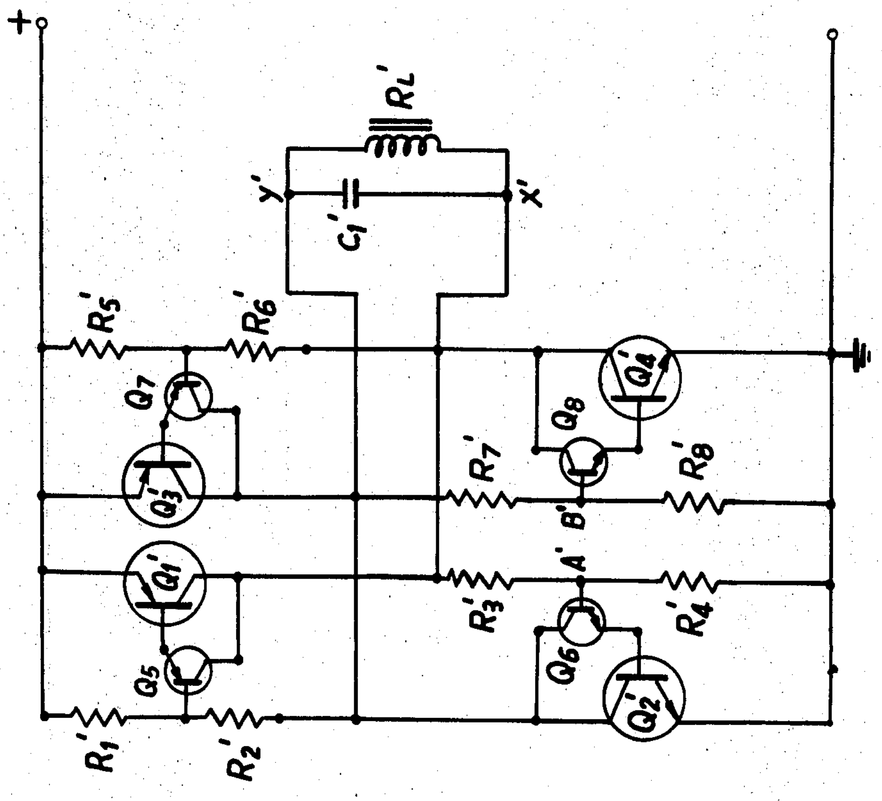

Two types of oscillator circuits are shown. The first includes an RC coupled oscillator of variable frequency, and the second a relaxation oscillator in tandem with a typical oscillator circuit to form a variable pulse width oscillator.

BACKGROUND OF THE INVENTION

The present invention relates to a transistor circuit arrangement for converting power from a direct current source into alternating current.

Transistorized DC to AC inverters are not new; however, the recent trend of sophistication in the electronic art has imposed requirements with respect to size, regulation, and frequency control, far more stringent than in the past. The manner in which these and other attendant circiut requirements fail to be met by the present state of the art shall be discussed hereinafter in order to provide a better background for an understanding of the invention.

Conventional converters generally obtain current flow reversal through the loads by the use of transformers, mechanical contacts, or special windings on the load. Transformers and special coils in parallel with the load offer transistor switching bias to effect the reversal of current, but call for circuit elements which are both expensive, and by today's standards, extremely wasteful of space. Further, since the inverter may be placed in close proximity to sensitive electronic circuits, the generation of magnetic fields should be at an absolute minimum. This, of course, is intrinsically impossible with the use of transformers. Mechanical contacts on the other hand are inherently short-lived.

In order to maintain good frequency stability and voltage regulation conventional inverters generate an output voltage significantly less than the input. In such a case, when absorbing higher input levels of voltages the switching transistors are required to absorb the excess power. This requires transistors of a size much greater than that necessary if used only for the switching function.

Conventional inverter circuits are also susceptible to lock-up; that is, where the voltage is applied slowly, the system refuses to go into oscillation. While proper design of a conventional circuit will obviate this problem, a circuit immune to lock-up would be much more desirable.

Accordingly, it is the object of this invention to provide a transistorized DC to AC inverter of minimal size and complexity which provides for the reversal of the current flow through the load without the use of transformers, special windings, or mechanical contacts.

It will be appreciated, however, the use of a coupling transformer in the circuit as a passive device, that is, one that does not in itself initiate switching, will not circumvent the uniqueness of the circuit.

It is a further object of this invention to provide an inverter in which no magnetic field is generated by the switching device.

It is another object of this invention to provide an inverter which is immune to lock-up, and which will go into oscillation regardless of the speed of voltage application.

It is a further object of this invention to provide an inverter circuit wherein only switching energy is absorbed by the transistors, and wherein input power to the load may be held constant over the practical operating range without the dissipation of power in either the translators or the inductive load.

SUMMARY OF THE INVENTION

Briefly, the invention is predicated upon the concept of providing complementary pairs of switching transistors having their collector-emitter circuits in series with the load, and having their bases so connected that inductive energy stored in the load each half cycle may be employed to complete the switching action. The switching is initiated by an outside oscillatory source. Provision is made for the switching on of the second transistor pair to be delayed sufficiently to allow the inductive energy stored in the load to be absorbed by a power capacitor. This energy is then utilized by the load on the next half cycle and it is not necessary that it be absorbed by the switching transistors.

The above mentioned and other features and objects of this invention and the manner of attaining them will become more apparent and the invention itself will best be understood by reference to the following description of embodiments of the invention taken in conjunction with the accompanying drawings, the description of which follows.

Figure 1:
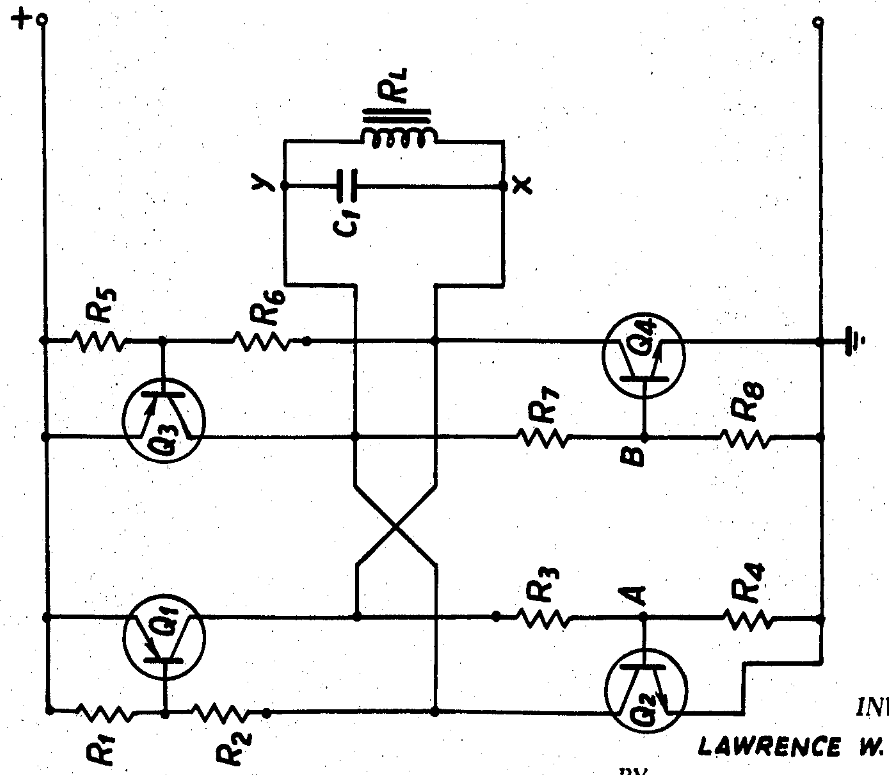
Figure 4:
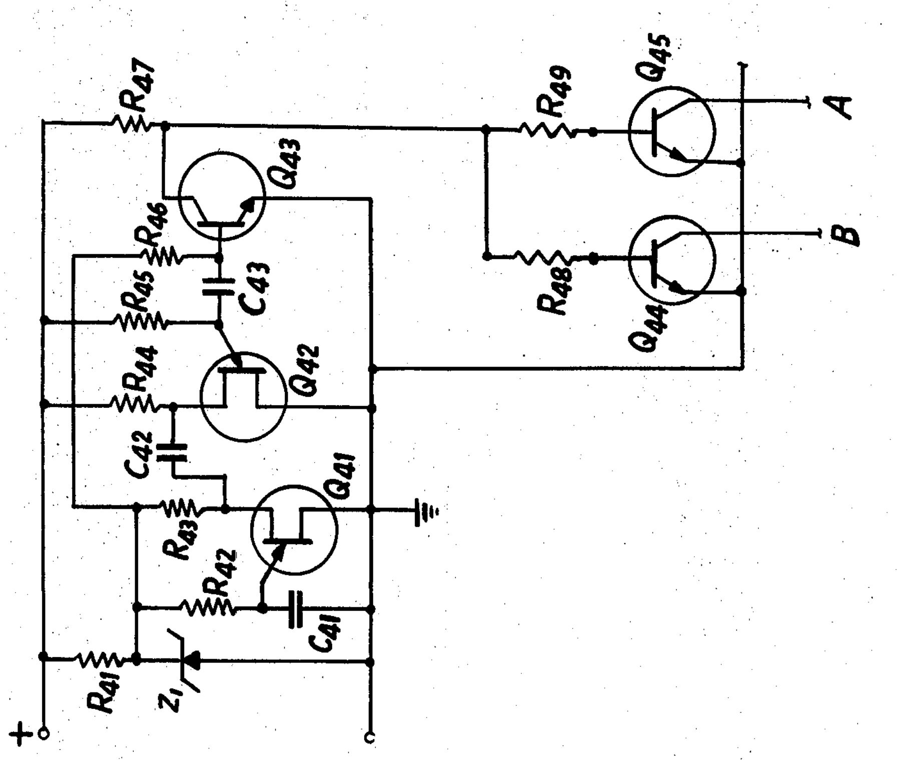
Figure 3:
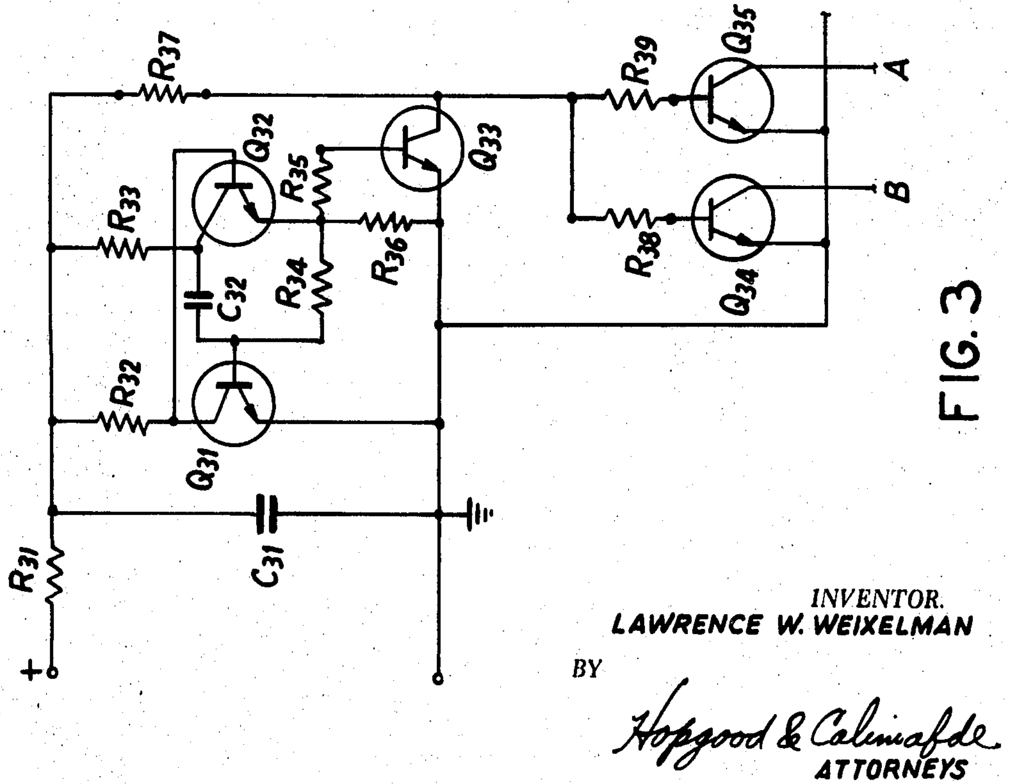

FIG. 1 schematically illustrates the first embodiment of the DC to AC inverter switching circuit according to the invention;

FIG. 2 schematically illustrates the second embodiment of the DC to AC inverter switching circuit according to the invention; and FIGS. 3 and 4 illustrate alternative oscillator and driver circuits to be employed in conjunction with the inverter switching circuit.

DETAILED DESCRIPTION OF THE DRAWINGS

Turning now FIG. 1, the DC to AC inverter switching circuit according to the invention is constituted and functions as follows.

Transistors $Q_1$ and $Q_3$ are of the PNP type and each is associated with a complementary NPN type transistor (transistors $Q_2$ and $Q_4$, respectively). Transistors $Q_1$ and $Q_2$ form a first pair of complementary transistors, and $Q_3$ and $Q_4$ a second pair. As may be seen from the figure, each pair is incorporated in a current path which includes the collector-emitter of the transistor, the inductive load (and power capacitor $C_1$), and the collector-emitter circuit of the complementary transistor.

Since transistors inherently posses slightly varying gains, assume that transistors $Q_1$ and $Q_2$ have a slightly greater current gain than $Q_3$ and $Q_4$. When power is supplied to the circuit, current will flow down through the emitter of transistor $Q_1$ through resistor $R_2$ through the inductive load $R_L$ through resistor $R_3$ and the emitter of transistor $Q_2$ to ground.

The foregoing results in a flow of collector current in both the transistor $Q_1$ and $Q_2$, rapidly driving each into saturation. Current will also begin to flow through transistors $Q_3$ and $Q_4$, but, because of their higher gain, transistors $Q_1$ and $Q_2$ will turn on faster. This will shut down transistors $Q_3$ and $Q_4$ because of the rise in potential at the lower junction of resistor $R_6$ and the drop in potential at the upper junction of resistor $R_7$.

With transistors $Q_1$ and $Q_2$ conducting, current flows down through transistor $Q_1$ emitter to collector to the load terminal designated *x*, through the inductive load $R_L$ to the load terminal *y*, and through the transistor $Q_2$ (collector to emitter) to ground. Assuming now a negative pulse is applied to the bases of transistors $Q_2$ and $Q_4$ (and the manner in which this is accomplished will be described later), both of these transistors will be held in the off state. When now the current decreases through the inductive load $R_L$ because of transistor $Q_2$ being turned off, a voltage will be generated by the collapsing flux in the load. This flux induces a voltage of opposite polarity to that when transistors $Q_1$ and $Q_2$ are conducting. The voltage generated by the inductive load is positive at load terminal *y*, thereby attempting to turn on transistor $Q_4$ through resistor $R_7$. The same voltage is negative at load terminal *x* and will turn on transistor $Q_3$ through resistor $R_6$.

From the foregoing, it will be appreciated that the designation "inductive load" includes any load having an inductive component or includes a small reactive inductor in parallel with the load.

If now the negative pulse is removed from the bases of transistors $Q_2$ and $Q_4$, at this time during the cycle transistor $Q_4$ will turn on. With transistors $Q_3$ and $Q_4$ conducting, transistors $Q_1$ and $Q_2$ are held in the off state for reasons similar to those described with respect to transistors $Q_3$ and $Q_4$, until the next negative pulse is applied to the bases of transistors $Q_2$ and $Q_4$. At this time the cycle will repeat itself. Thus, the direction of current flow through the inductive load is reversed at a frequency determined by the negative pulse rate applied to the bases of transistors $Q_2$ and $Q_4$. A positive pulse applied to the bases of $Q_1$ and $Q_3$ may be used in lieu of the negative pulse applied to the bases of $Q_2$ and $Q_4$ to control the switching action.

Capacitor $C_1$ is employed to increase the efficiency of the circuit by absorbing the inductive energy released by the inductive load. This is accomplished by switching on the second transistor pair in a slightly delayed manner to allow this inductive energy to be absorbed and fed back the next half cycle. The energy may then be utilized by the inductive load on the next half cycle and need not be absorbed by the switching transistors.

FIG. 2 shows an alternative arrangement. In this figure the prime designations refer to those circuit elements similarly disposed as those in FIG. 1, but not necessarily of the same value. Smaller transistors $Q_5$ through $Q_8$ are employed in a darlington configuration, the emitters of each of the smaller transistors being coupled to the bases of the transistors described in FIG. 1. Note that the smaller transistors are themselves complementary. This arrangement permits the resistance of resistors $R_2$, $R_3$, $R_6$, and $R_7$ to be increased, the amplifying action of these additional transistors reducing the losses and improving the overall efficiency of the DC to AC conversion.

FIG. 3 illustrates an oscillator and driver circuit for the inverters of FIGS. 1 and 2. In this figure, designations A and B refer to connections to similary designated points A and B in the inverter circuits.

Transistors $Q_{31}$ and $Q_{32}$ together form an RC coupled oscillator which operates substantially as follows. When the circuit is energized, capacitor $C_{32}$ begins to charge through resistor $R_{33}$ and the base to emitter of transistor $Q_{31}$. This charging current turns on transistor $Q_{31}$ which essentially clamps the base of transistor $Q_{32}$ to ground, keeping it turned off. When the charging current through capacitor $C_{31}$ drops below the level needed to keep transistor $Q_{31}$ in saturation, the voltage begins to rise on the base of transistor $Q_{32}$ turning it on. Capacitor $C_{32}$ begins to discharge through transistor $Q_{32}$, thereby turning transistor $Q_{31}$ off. When transistor $Q_{32}$ is conducting, there is sufficient voltage across resistor $R_{36}$ back on through resistor $R_{34}$, but not until capacitor $C_{32}$ discharges sufficiently. When transistor $Q_{31}$ turns back on the cycle repeats.

Transistor $Q_{33}$ is an isolation stage transistor to prevent transistors $Q_{34}$ and $Q_{35}$ from loading the oscillator. When transistor $Q_{32}$ is off, transistor $Q_{33}$ is off, and transistors $Q_{34}$ and $Q_{35}$ are on through resistor $R_{37}$. When transistors $Q_{34}$ and $Q_{35}$ are turned on, they clamp the bases of the transistors of the complementary transistor inverter circuit (FIGS. 1 and 2) so that they cannot conduct. This then controls the switching of these latter transistors.

It will be appreciated that in the oscillator circuit described, the length of the on and off time of transistor $Q_{32}$ is easily adjustable by changing the values of capacitor $C_{32}$ and resistor $R_{34}$, thereby controlling the length of the time that transistors $Q_2$ and $Q_4$ in the switching circuit are turned off.

It will be further appreciated that the oscillation frequency stability of the circuit over a wide voltage and temperature range can be held within 1% by a proper selection of resistors $R_{32}$, $R_{33}$, and $R_{36}$. It will also be recognized by those skilled in the art that a standard crystal controlled oscillator or similar means may be used to increase the frequency stability to a much higher level.

FIG. 4 shows an alternative oscillator and driver circuit which provide means for changing the length of the trigger pulse to thereby maintain approximately the same average input power to the motor with variations in the input voltage.

Resistor $R_{41}$ and Zener diode $Z_1$ form a common Zener diode voltage regulation circuit. Transistor $Q_{41}$, resistors $R_{42}$ and $R_{43}$, and capacitor $C_{41}$ form a typical unijunction relaxation oscillator circuit. The frequency of oscillation is determined by a resistor $R_{42}$ and capacitor $C_{41}$. This oscillator is used to control the frequency of the inverter through another oscillator. Transistors $Q_{42}$ and $Q_{43}$, with their associated circuitry form another typical oscillator circuit. Current flows through resistor $R_{46}$ and the base to emitter of transistor $Q_{43}$, turning transistor $Q_{43}$ on. This turns transistors $Q_{44}$ and $Q_{45}$ off, and one set of the inverter transistors will turn on. Capacitor $C_{43}$ begins to charge through resistor $R_{45}$. When the voltage on capacitor $C_{43}$ reaches the trigger voltage of unijunction transistor $Q_{42}$, this transistor turns on and capacitor $C_{43}$ begins discharging through transistor $Q_{42}$ to ground. This action drives the base of transistor $Q_{43}$ negatively, turning off transistor $Q_{43}$ until capacitor $C_{43}$ discharges sufficiently through resistor $R_{46}$. At this point the cycle begins over again and transistor $Q_{43}$ turns back on and capacitor $C_{43}$ begins to charge.

When transistor $Q_{43}$ is turned off, transistors $Q_{44}$ and $Q_{45}$ are turned on, initiating the switching action in the inverter. The length of time that transistor $Q_{43}$ is turned off is determined by resistor $R_{46}$, capacitor $C_{43}$, and the voltage level that capacitor $C_{43}$ is charged to before transistor $Q_{42}$ triggers. The voltage across resistor $R_{46}$ and capacitor $C_{43}$ is held constant by the Zener diode $Z_1$, but the voltage across transistor $Q_{42}$ varies with the input voltage. When the input voltage increases, the voltage of which transistor $Q_{42}$ triggers increases and the voltage level that capacitor $C_{43}$ reaches each cycle is increased, thereby increasing the time that transistor $Q_{43}$ is turned off. Thus, the inverter is turned off for a longer portion of each cycle limiting the power to the motor as the input voltage increases.

At 400 hertz, for example, the inverter can be turned off for up to 50% of each cycle if capacitor $C_{41}$ (across the inductive load) is sufficiently large. Changing the length of the "off" part of the cycle changes the frequency of the oscillator. The purpose of the first unijunction relaxation oscillator described is to maintain the frequency constant by applying synchronous pulses through capacitor $C_{42}$.

With the described circuit arrangement, it will be appreciated by those skilled in the art that the inductive load specifically mentioned in connection with the invention may be constituted by an AC motor. It should also be appreciated that the basic inverter circuit readily easily lends itself to two and three phase systems with the basic inverter circuit shown in FIG. 1 or 2 used for each phase. A ring counter or similar circuit may then be used to synchronize each phase with the right phase relationship.

While the principles of the invention have been described in connection with specific apparatus, it is to be clearly understood that this description is made only by way of example and not as a limitation to the scope of the inventoin as set forth in the objects thereof and in the accompanying claims.

What is claimed is:

1. A DC to AC inverter comprising:

an inductive load;

a pair of first and second type complementary transistors having their collector-emitter circuits coupled in series with said load on the respective sides thereof;

a second pair of first and second type complementary transistors having their collector-emitter circuits coupled in series with said load on the respective sides thereof;

both of said first type transistors having their collector-emitter circuits coupled to one terminal of the DC source, and both of the second type transistors having their collector-emitter circuits coupled to the other terminal of the DC source;

bias means coupled to the base of each of said transistors; and pulse generator means, having variability in one of frequency and pulse width, for simultaneously driving the bases of at least said first type transistors with a voltage polarity to turn both said transistors off.

2. The DC to AC inverter claimed in claim 1, wherein said bias means each comprises a pair of resistors, one coupled from a DC source terminal to a transistor base, and the other from said transistor base to the complementary transistor collector-emitter circuit.

3. The DC to AC inverter claimed in claim 1, further comprising an auxiliary transistor coupling the base of each of said transistors to said bias means for reducing the power loss.

4. The DC to AC inverter claimed in claim 1, further comprising a capacitor connected in parallel with the load for storing energy during a determined portion of each cycle.

5. The DC to AC inverter claimed in claim 1, wherein said driving means comprises a pair of transistors having their bases coupled in common and their respective collector-emitter circuits coupled to said first type transistors.

6. The DC to AC inverter claimed in claim 5, comprising means responsive to an increase in the input voltage for increasing the period in which the inverter is in the turned-off condition.

7. The DC to AC inverter claimed in claim 6, wherein said last mentioned means comprises:

an input Zener diode voltage regulation circuit;

a unijunction relaxation oscillator coupled to said regulation circuit; and a second oscillator circuit coupled between said unijunction oscillator circuit and said driving means transistors.

8. An AC to DC inverter claimed in claim 1, wherein means for simultaneously driving the bases comprises a controllable frequency, constant pulse width, pulse generator.

9. An AC to DC inverter claimed in claim 1, wherein means for simultaneously driving the bases comprises a controllable frequency, variable pulse width, pulse generator.

10. The DC to AC inverter claimed in claim 1, wherein said pulse generator means is of variable pulse width and comprises:

an input Zener diode voltage regulation circuit;

a unijunction relaxation oscillator coupled to said regulation circuit; and a second oscillator circuit coupled to said relaxation oscillator, the relaxation oscillator controlling the frequency of said pulse generator means and the second oscillator controlling the pulse width thereof.

11. The DC to AC inverter claimed in claim 10, in which said pulse generator means further comprises a pair of transistors having their bases coupled in common and their respective collector-emitter circuits coupled to said first type transistors.

12. The DC to AC inverter claimed in claim 1, in which said pulse generating means is frequency variable and comprises an RC coupled oscillator.

13. The DC to AC inverter claimed in claim 1, in which the RC coupled oscillator comprises a pair of transistors in tandem, the base of the first transistor being coupled via said capacitor and resistor across the collector and emitter of the second transistor.

14. The DC to AC inverter claimed in claim 13, in which said pulse generator means further comprises a pair of transistors having their bases coupled in common and their respective collector-emitter circuits coupled to said first type transistors.

References Cited

UNITED STATES PATENTS

| | | | |
|---|---|---|---|
| 2,972,710 | 2/1961 | D'Amico | 321—450X |
| 3,080,534 | 3/1963 | Paynter | 331—110X |
| 3,172,059 | 3/1965 | Freeborn | 331—110X |
| 3,311,807 | 3/1967 | Rodaer | 321—18 |
| 3,344,336 | 9/1967 | Moyer et al. | 321—45X |

OTHER REFERENCES

IBM Technical Disclosure Bulletin, "Free Running Bridge Inverter," vol. 9, No. 10, p. 1462, March 1967.

WILLIAM H. BEHA, JR., Primary Examiner

U.S. Cl. X.R.

321—45; 331—47, 110